Figure 1:
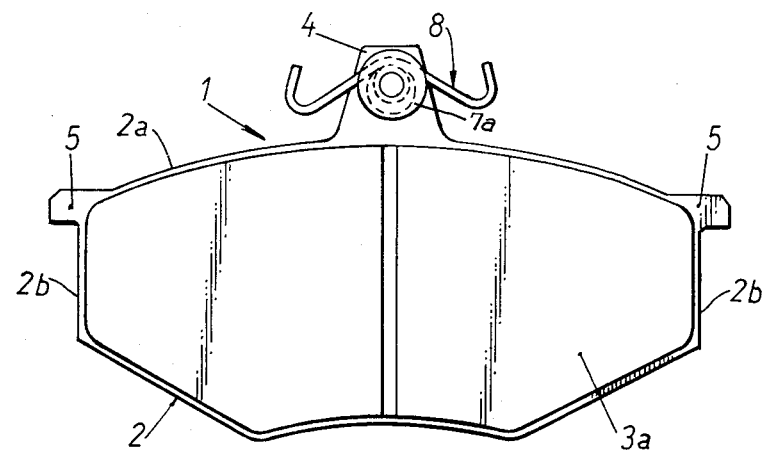

United States Patent [19]
Wienand et al.

[11] 4,056,174
[45] Nov. 1, 1977

[54] FRICTION PAD ASSEMBLIES FOR SLIDING CALIPER DISC BRAKES

[75] Inventors: Hans-Jürgen Wienand, Steimel; Horst Willi Klassen, St. Sebastian, both of Germany

[73] Assignee: Girling Limited, Birmingham, England

[21] Appl. No.: 643,827

[22] Filed: Dec. 23, 1975

[30] Foreign Application Priority Data

Dec. 24, 1974 United Kingdom ............... 55727/74

[51] Int. Cl.$^2$ ............................................ F16D 65/00
[52] U.S. Cl. ............................................ 188/73.5
[58] Field of Search ............ 188/73.5, 73.3, 73.1, 188/72.4, 205 A, 250 E

[56] References Cited

U.S. PATENT DOCUMENTS

| | | | |
|---|---|---|---|
| 3,616,878 | 11/1971 | Girauldon | 188/73.5 |
| 3,677,372 | 7/1972 | Burnett | 188/73.5 X |
| 3,712,423 | 1/1973 | Girauldon | 188/73.5 |
| 3,768,605 | 10/1973 | Carre | 188/73.5 |
| 3,917,033 | 11/1975 | Rath et al. | 188/73.3 |
| 3,958,667 | 5/1976 | de Gennes | 188/73.1 X |

FOREIGN PATENT DOCUMENTS

| | | | |
|---|---|---|---|
| 1,927,459 | 5/1970 | Germany | 188/73.5 |
| 1,475,372 | 3/1969 | Germany | 188/73.5 |
| 42,252 | 11/1971 | Japan | 188/73.5 |

*Primary Examiner*—George E. A. Halvosa
*Attorney, Agent, or Firm*—Scrivener, Parker, Scrivener & Clarke

[57] ABSTRACT

The present specification describes and claims a friction pad assembly for use in a sliding caliper disc brake and a sliding caliper disc brake incorporating such an assembly. The friction pad assembly comprises a backing plate, a pad of friction material secured to the backing plate, and a wire spring attached to the backing plate and extending outwardly in two directions from its point of attachment to the backing plate. When the assembly is incorporated in a sliding caliper disc brake which comprises a torque member and caliper member, the wire spring engages the caliper member both pressing the friction pad assembly down onto guides in the torque member and biasing the torque member and caliper member apart to take up any clearance. Thus the possibility of the assembly rattling in the brake and the torque member and caliper member rattling together, is reduced.

9 Claims, 9 Drawing Figures

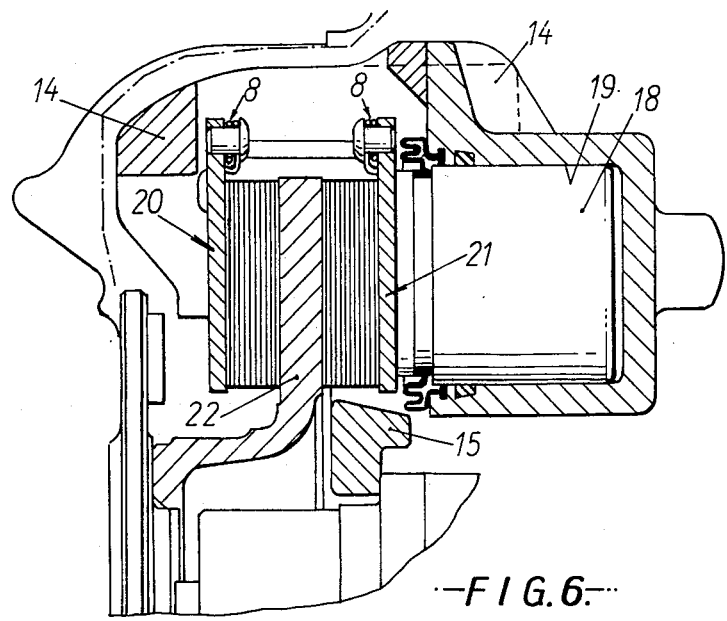
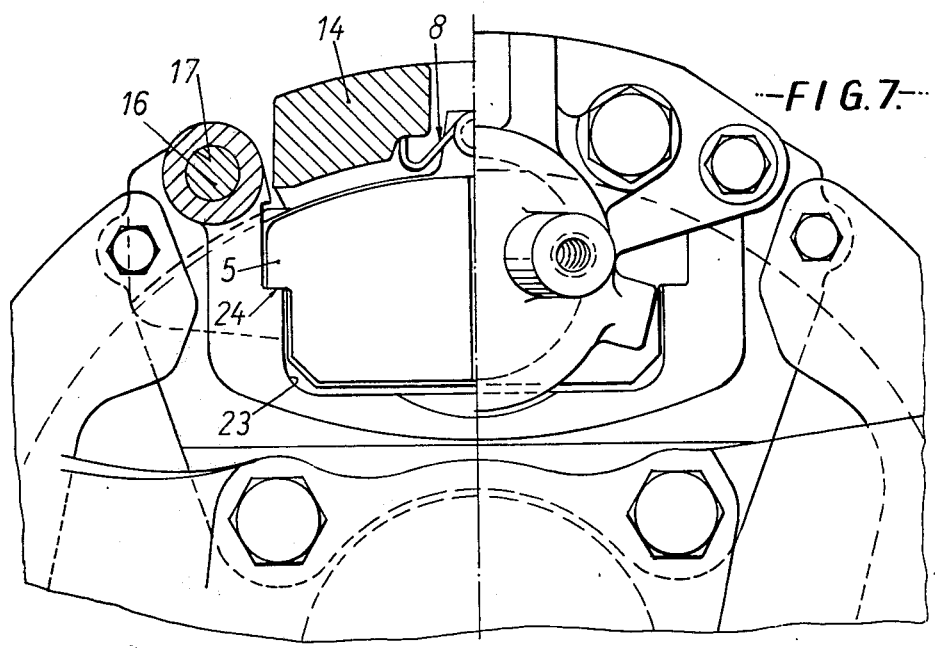

FRICTION PAD ASSEMBLIES FOR SLIDING CALIPER DISC BRAKES

The present invention relates to a friction pad assembly for use in sliding caliper disc brakes and a sliding caliper disc brake incorporating such a friction pad assembly.

In most constructions of caliper disc brakes, the friction pads are supported on or between guides to which forces due to braking are transmitted from the pad and hence to the vehicle frame. It is necessary to provide some degree of clearance at these guides to permit the pads to slide towards and away from the disc during braking and to ensure freedom from pad seizure. This can result in the pads rattling in these guides. To reduce this problem it is known to incorporate a resilient means, usually a spring, to bias the pad against one side of the guide. Problems with such resilient means, specifically springs, are that the springs heretofore known are subject to many of the following:

1. They do not exert substantially the same force between pad and guide throughout the life of the pad.
2. They are not easy to assemble in and dismantle from a brake.
3. They give rise to spurious loads and couples that tend to displace the pad from its desired position and attitude in a brake caliper.
4. They cut, or otherwise damage the flexible rubber boots which are provided to protect the piston or pistons in a brake caliper.
5. They are not particularly cheap to manufacture or install.
6. They take up space which could be usefully filled by other brake components to enhance brake performance, particularly the rigidity of the brake.

The aim of the present invention is to provide a friction pad assembly which includes an anti-rattle spring arrangement which solves all of these problems.

According to the present invention there is provided a friction pad assembly comprising a backing plate and a pad of friction material secured thereto, a wire spring being attached to the backing plate and extending outwardly in two directions from its point of attachment to the backing plate.

In a preferred embodiment of the present invention the backing plate has a tab or projecting part thereof which is free of friction material and which is located in the middle region of what will be the upper side of the assembly when inserted in a brake. A hole is provided in the tab and a pin engages through the hole, the wire spring being pivotally mounted on the pin. Preferably the pin and spring are fixedly attached to the backing plate. Alternatively, however, the spring may be detachable from the backing plate. The wire spring essentially comprises a coiled region formed by at least one coil which engages over the pin so that the axis of the coiled region is substantially perpendicular to the working surface of the friction pad, the free end regions of the spring projecting in opposite directions from the coiled region of the spring. Further, the sides of the backing plate are provided with laterally projecting shoulders which, in use, engage guides in the torque member.

The spring is fixed to the pad backing plate before the pad assembly is installed in the brake e.g. during manufacture, so that during installation it cannot slip and damage the flexible boot normally provided in a disc brake to protect the cylinder and piston against the ingress of dirt and moisture. Also, if the spring is permanently attached to the pad back-plate it cannot be mislaid during pad replacement and must always be replaced when the pads are changed, ensuring no degradation of performance. The attachment assures that, in use, the attitude of the spring to its associated pad backing plate remains constant, irrespective of the state of pad wear, so avoiding spurious displacements of the pad caused by offset spring forces.

According to a further feature of the present invention there is provided a friction pad assembly in combination with a sliding caliper disc brake, the brake comprising a torque member and a caliper member incorporating at least one hydraulic actuator, the caliper member being attached to the torque member for sliding movement relative thereto and arranged to act on the friction pad assembly which is located in a recess in the torque member, the friction pad assembly comprising a backing plate, a pad of friction material, and a wire spring, the wire spring being attached to the backing plate and extending outwardly in two directions from its point of attachment to the backing plate, the spring also engaging the caliper member.

Thus, when a friction pad assembly constructed in accordance with the present invention is in use in a sliding caliper disc brake e.g. of the sliding pin type, the outwardly extending arms of the spring press against the caliper member and are deflected somewhat from their free attitude. The arms thus exert resilient forces against the caliper member, the reaction to the sum of which forces appears at the spring attachment point on the backing plate, thus pressing the friction pad assembly down on guides in the torque member. The spring thus has a two-fold purpose, to bias the friction pad assembly relative to the caliper member and to effectively bias the caliper member relative to the torque member. Thus the spring acts both to prevent the friction pad assembly rattling in the guides in the torque member and to reduce the possibility of rattling occurring between the caliper member and torque member. This latter source of rattling is inherent in any sliding caliper disc brake as a clearance must be provided on the guides which control the sliding movement of the caliper member to ensure freedom from seizure or jamming. For example, in a sliding caliper disc brake of the sliding pin type, guide pins on the caliper member pass with clearance through bores in the torque member, and in accordance with the further feature of the present invention the pins will be biased against the walls of the bores.

It has previously been known to achieve this duplication of function, but by means of a plate spring which is not attached to the backing plate and which suffers from all the problems itemised hereabove.

The spring that forms part of the friction pad assembly of the present invention preferably includes a coiled region between the outwardly extending arms, the coiled region serving as a convenient location for attaching the spring to the backing plate. This spring construction provides for a high performance from the minimum quantity of metal resulting in the benefits described hereinafter.

Whilst the friction pad assembly according to the present invention can be used to best advantage in a sliding caliper disc brake, in accordance with the further feature of the present invention it may also be used with advantage in any other type of disc brake to overcome the problems itemised hereabove. However in such other types of disc brake the spring will have only one function. That is, to prevent the friction pad assembly rattling on its guides in the brake.

Figure 2:
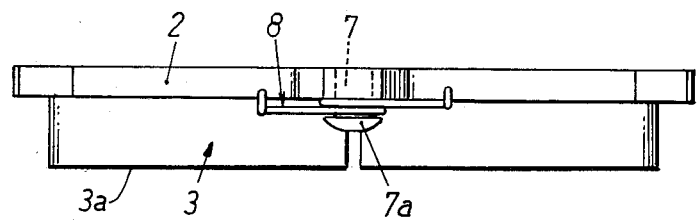
Figure 3:
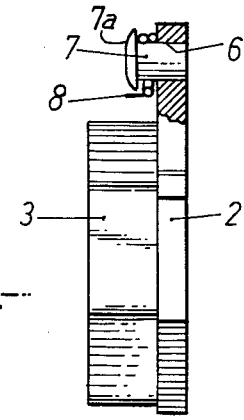
Figure 4A:
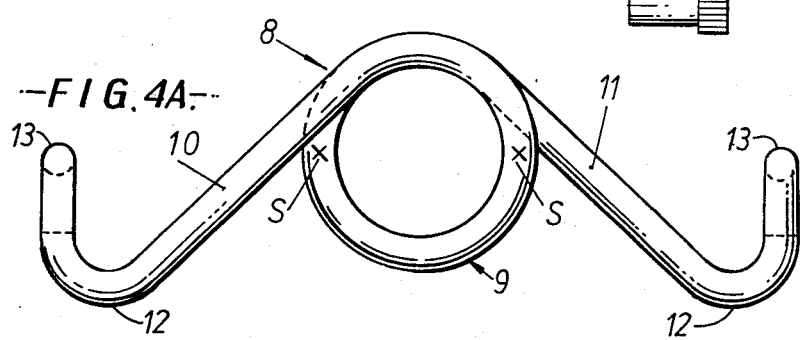
Figure 4B:
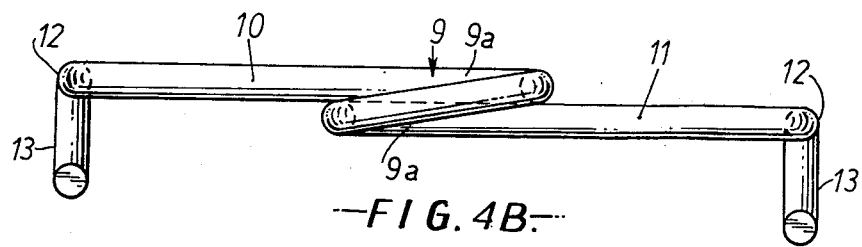
Figure 4C:
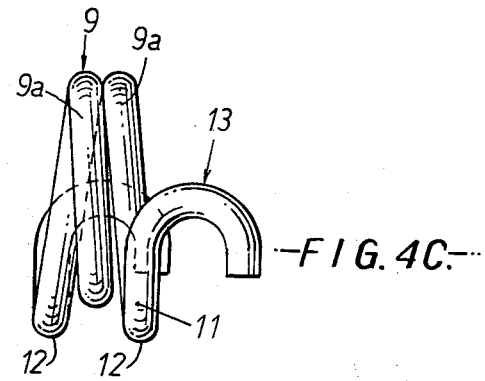
Figure 5:
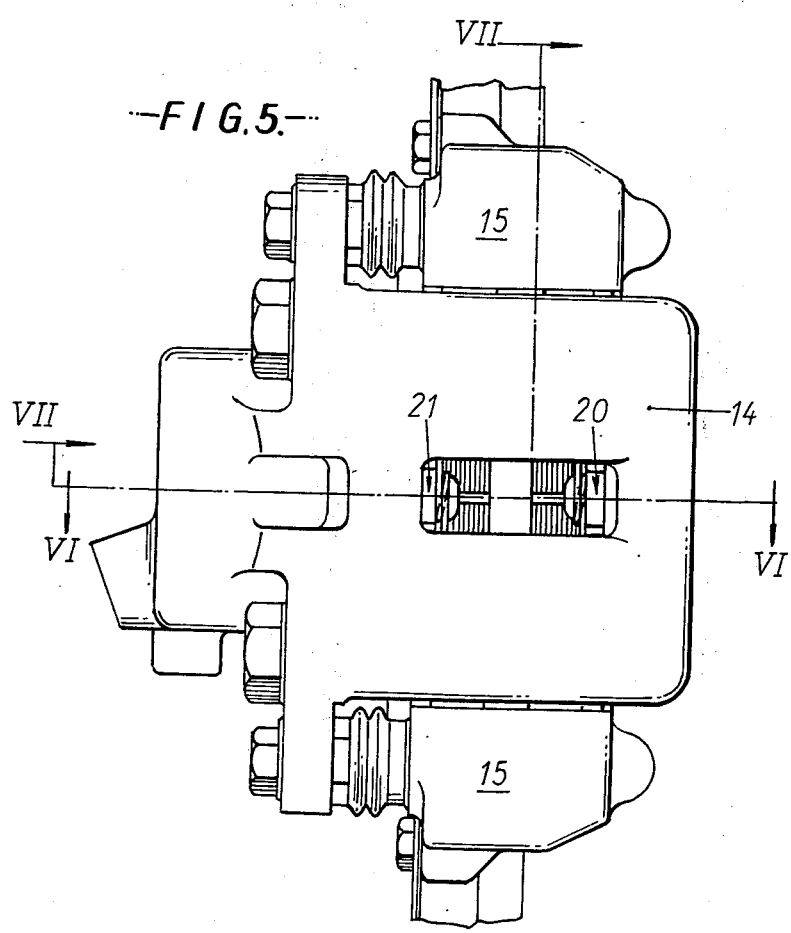

The present invention will now be further described, by way of example, with reference to the accompanying drawings, in which:

FIG. 1 is a front view of a preferred embodiment of a friction pad assembly constructed according to the present invention, FIG. 2 is a plan view of the embodiment of FIG. 1, FIG. 3 is a partial cross-sectional view of an end elevation of the embodiment of FIG. 1, FIGS. 4A, 4B, 4C are enlarged views of the wire spring used in the friction pad assembly illustrated in FIGS. 1 to 3, FIG. 5 is a plan view of a sliding caliper disc brake incorporating friction pad assemblies as per FIG. 1, FIG. 6 is a sectional view along line VI—VI in FIG. 5, and FIG. 7 is a rear view of the disc brake of FIG. 5 cut away along line VII—VII in FIG. 5.

FIGS. 1 to 3 illustrate a preferred embodiment of a friction pad assembly constructed in accordance with the present invention, for use in a sliding caliper disc brake. The friction pad assembly generally designated 1, comprises a backing plate 2 and a pad of friction material 3. The upper edge 2a of the backing plate 2 as illustrated in FIG. 1, has an upwardly projecting part or tab 4 which is free of friction material, and two laterally projecting shoulders 5 also free of friction material. The tab 4 is arranged approximately in the middle of the upper side edge 2a of the backing plate and a hole 6 extends therethrough. A pin 7 having a head 7a engages through hole 6, a wire spring 8 being pivotally mounted on pivot pin 7. The pin 7 and wire spring 8 are fixed to the backing plate, as by riveting the pin to the backing plate, so that an old weak spring cannot be fixed to a replacement friction pad and backing plate. However, alternatively the pin 7 may be detachable from the backing plate 2 enabling wire spring 8 to be replaced if so desired.

As shown in FIGS. 4A, 4B and 4C, the wire spring 8 comprises a central coiled region 9 formed by a couple of coils 9a. If required only one coil or more than two coils may alternatively form the coiled region 9. The end regions 10 and 11 of the spring extend from opposite ends of the coiled region 9 in opposite directions and are each bent at one location 12 about an axis parallel to the axis of the coiled region 9 and at another location 13 further from the coiled region 9, about an axis perpendicular to the axis of the coiled region 9. The coiled region 9 of the spring 8 is located over pin 7 so that the axis of the coiled region is substantially perpendicular to the working surface 3a of the pad 3.

In use the end regions 10 and 11 of the spring are subject to a varying bending moment which is zero at the points of application of the load i.e. points 13, rising to a maximum at the point where the spring abuts the pin 7. When designing a steel spring the amount of metal used to provide the required loads and travels is determined by the maximum stress permissible in the metal. If a spring design leads to the maximum stress occurring at a single point as often happens with plate or leaf springs, then the rest of the metal of the spring is not utilised to its full potential. This is wasteful of material and space. Thus it is desirable that the metal should be subject to its maximum stress over as large a proportion of its volume as possible. In the spring illustrated in FIG. 4A the positions of maximum stress are marked 'S'. These points are of course the positions of maximum bending moment. The stress around the whole coiled region 9 is only slightly reduced from the maximum and most of the metal is concentrated in this region. Thus by providing a circular coil about an axis perpendicular to the plane defined by the lines of action of the forces on the spring the metal is concentrated in the region of highest stress achieving maximum metal utilisation. The present invention in the above described embodiment, achieves this benefit whilst fulfilling the requirements of a pad anti-rattle spring.

Apart of course from using the minimum quantity of metal in the spring, the high metal utilisation ensures that it takes up very little room, at a place where the minimum of interference with other components is essential.

FIGS. 5 to 7 of the accompanying drawings illustrate the friction pad assembly of FIG. 1 installed in a sliding caliper disc brake of the sliding pin type. The disc brake comprises a caliper member 14 and a torque member 15, the caliper member 14 being provided with pins 16 (only one of which is evident in FIG. 7) which slide in bores 17 in the torque member 15. As seen in FIG. 6 the caliper member 14 includes a hydraulically operable piston 18 which can be axially moved by hydraulic pressure in cylinder 19 to act on friction pad assembly 21, caliper member 14 sliding relative to torque member 15 causing friction pad assemblies 20 and 21 to grip opposite sides of disc 22. The friction pad assemblies 20 and 21 are located in recesses 23 in the torque member 15 (FIG. 7), the laterally projecting shoulders 5 of the respective backing plates engaging on shoulders 24 on the sides of the recesses 23, which shoulders 24 act as guides for the friction pad assemblies. As seen in FIG. 7 wherein only one friction pad assembly is evident, point A (FIG. 4C) of each end of the wire spring 8 engages against the caliper member 14 thus both pressing the friction pad assembly 21 down onto the shoulders 24 preventing or reducing pad rattle in the torque member and also pressing up on the caliper member 14 to thus take up any tolerance between pins 16 and bores 17 so preventing or reducing rattle between the caliper member and torque member.

Thus, the wire spring of the friction pad assembly of the present invention obviates the necessity for two specific springs, sets of springs, or resilient members which have previously been used for biasing the caliper member away from the torque member to take up manufacturing tolerances and to prevent pad rattle.

In known sliding caliper disc brakes utilising a spring to bias the caliper member away from the torque member, when the caliper member is removed, the biasing spring is immediately released and in practice quite often damages the dirt seal on the hydraulic actuator in the caliper member. This is of course undesirable and the friction pad assembly of the present invention removes this danger as the spring is secured to the backing plate preventing random movement of the spring.

We claim:

1. A friction pad assembly in combination with a sliding caliper disc brake, the brake comprising a torque member and a caliper member, at least one hydraulic actuator being incorporated in the caliper member, the caliper member being attached to the torque member for sliding movement relative thereto and arranged to act on the friction pad assembly which is located in a recess in the torque member, wherein the friction pad assembly comprises a backing plate, a pad of friction material secured to the backing plate, and a wire spring, a tab of the backing plate being free of friction material and a pin being permanently attached to said tab, the wire spring having a coiled region, the end regions of the spring protruding in two directions from said coiled region, the coiled region being fitted over a shank portion of the pin and a headed portion of the pin retaining the spring on the pin, the whole of the spring and pin being confined to an area that is not swept by the disc of the disc brake under all conditions of pad wear, the end regions of the spring engaging the undersurface of a portion of the caliper member, and the friction pad assembly engaging guides in the torque member so that the spring acts to urge the pad assembly against the guides, and to urge the caliper member away from the pad assembly.

2. A friction pad assembly according to claim 1 wherein the pad of friction material has a planar working surface and the spring includes at least one coil whose axis is substantially perpendicular to said working surface.

3. A friction pad assembly according to claim 1 wherein the free end regions of the spring are each bent at two spaced apart locations, each end region in one location nearest to the coiled region being bent about an axis substantially parallel to the axis of the coiled region and in the other location being bent about an axis substantially normal to the axis of the coiled region.

4. A friction pad assembly according to claim 1 wherein the tab, is located in the middle region of what is the upper side of the backing plate when inserted in a brake, laterally projecting shoulders which, in use, engage guides in a brake, being provided on the side edges of the backing plate.

5. The combination according to claim 1, wherein laterally projecting shoulders are provided on the backing plate and engage abutment means in the recess.

6. The combination according to claim 1, wherein the pad of friction material has a planar working surface and the spring includes at least one coil whose axis is substantially perpendicular to said working surface.

7. The combination according to claim 1, wherein the free end regions of the spring are each bent at two spaced apart locations, each end region in one location nearest to the coiled region being bent about an axis substantially parallel to the axis of the coiled region and in the other location being bent about an axis substantially normal to the axis of the coiled region, said other locations engaging in caliper.

8. The combination according to claim 1, wherein the pin is riveted to the backing plate.

9. The combination according to claim 1, wherein the pin is riveted to the backing plate.

* * * * *